US008971514B2

(12) United States Patent
Statham et al.

(10) Patent No.: US 8,971,514 B2
(45) Date of Patent: Mar. 3, 2015

(54) AVOIDING FAILED ROUTES

(75) Inventors: Steven William Statham, Monument, CO (US); David E. Phelps, Colorado Springs, CO (US); Kirk Randall Hill, Monument, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 294 days.

(21) Appl. No.: 13/404,373

(22) Filed: Feb. 24, 2012

(65) Prior Publication Data
US 2013/0223605 A1 Aug. 29, 2013

(51) Int. Cl.
*H04M 7/00* (2006.01)
(52) U.S. Cl.
USPC .................. 379/221.03; 379/221.01
(58) Field of Classification Search
USPC ............. 379/265.01–265.02, 201.02, 221.01, 379/221.03
See application file for complete search history.

(56) References Cited

U.S. PATENT DOCUMENTS

| 5,896,448 | A | * | 4/1999 | Holt | 379/221.03 |
| 6,026,155 | A | * | 2/2000 | Takeuchi et al. | 379/212.01 |
| 8,611,509 | B1 | * | 12/2013 | Basart et al. | 379/88.17 |
| 2003/0129979 | A1 | * | 7/2003 | Cooper | 455/432 |

* cited by examiner

*Primary Examiner* — Rasha Al Aubaidi

(57) ABSTRACT

A system may include a failed route avoidance device. The failed route avoidance device may receive a notification that a record, of a call that failed to be extended to a contact agent in a customer network, is inserted into a failed call list; determine whether an identifier for the contact agent associated with the call is to be placed in an avoidance list based on a response code that a network element sends, to a call router that received the call, when the a connection from the call at the call router to the contact agent fails to be established; generate an avoidance record when the failed route avoidance device determines that the identifier for the contact agent is to be placed in the avoidance list; and send the avoidance record to a configuration device that inserts the avoidance record into the avoidance list.

20 Claims, 11 Drawing Sheets

| CONFIGURABLE PARAMETERS 1000 |
|---|
| ALARMING THRESHOLD ENABLED 1002 |
| ROUTE AVOIDANCE ENABLED 1004 |
| FAILED ROUTE COUNT THRESHOLD 1006 |
| FAILED ROUTE TIME THRESHOLD 1008 |
| FAILURE RESPONSE CODES 1010 |
| AVOIDANCE SENSITIVITY 1012 |
| SNMP DESTINATION 1014 |
| LOG LOCATION 1016 |
| TRACKING FAILURE REACTION 1018 |
| AVOIDANCE TIME 1020 |

AVOIDING FAILED ROUTES

BACKGROUND

When a user calls a call center, a call routing system that handles incoming calls may attempt to connect the user to one of multiple agents attending the call center. However, the attempt to connect to the agent may fail for a variety of reasons. For example, the call may be forwarded to a non-existing business group, the attempt to extend the call may be blocked, a server receiving the call may fail (e.g., when the call is voice-over-Internet Protocol (VoIP), etc.

BRIEF DESCRIPTION OF THE DRAWINGS

FIG. 10 shows exemplary configurable parameters for the failed route avoidance system of FIG. 1 according to one embodiment.

DETAILED DESCRIPTION

The following detailed description refers to the accompanying drawings. The same reference numbers in different drawings may identify the same or similar elements. As used herein, the terms "call forwarding" or "call routing" may include establishing a session between the calling party and a party to which the call is forwarded from the called party. In some instances, forwarding/routing may include terminating a session, if it exists, between the caller and called party. In addition, the terms "contact center agents," "call center agents," "call agents," "contact agents" may be used interchangeably.

At a contact center, a device may forward/route inbound calls to contact center agents (e.g., sales person, technical support agent, software agent (as opposed to a person), etc.). As used herein, the term "call extension" or "extending a call" may refer to connecting a received call to another destination (e.g., a contact center agent).

As described below, a system may avert contact center-wide call routing breakdown when telephony/Voice-over-Internet protocol (VoIP) delivery (e.g., extension) failures thwart call completions. The system may avert the breakdown by avoiding extending/routing calls to contact center agents to whom calls could not be completed. Without avoiding extending/routing the calls, such failures can lead to a wider contact center outage. Although the system may not be able to pinpoint the reasons for individual failures to extend incoming calls to contact center agents, the system may still prevent the compromised calls from causing undue harm to the overall contact center call routing.

Figure 1:
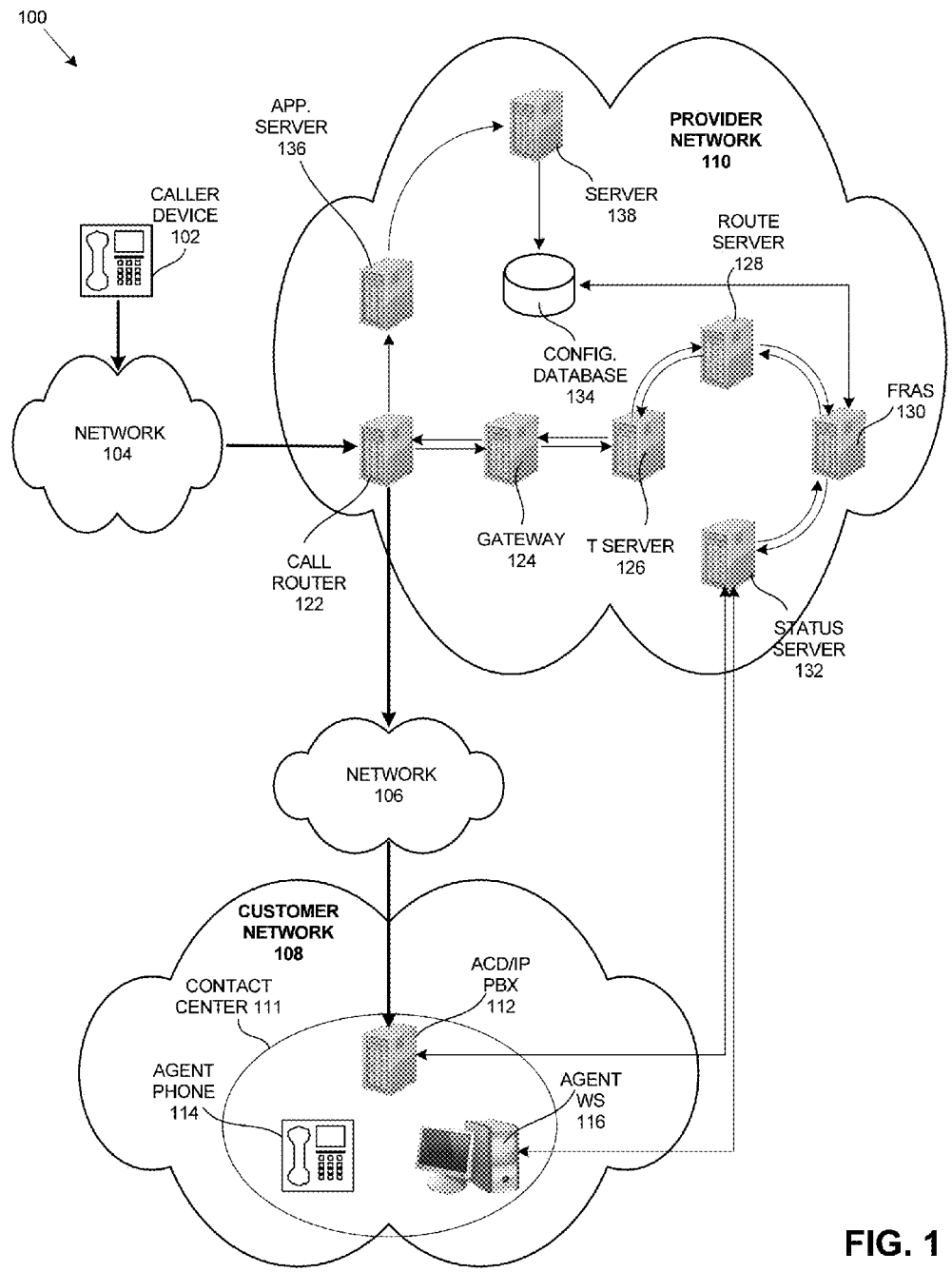
FIG. 1 illustrates an exemplary network in which concepts described here may be implemented.

FIG. 1 illustrates an exemplary network 100 in which concepts described here may be implemented. As shown, network 100 may include a caller device 102, network 104, network 106, customer network 108, and provider network 110.

Caller device 102 may call a contact center in customer network 108. Caller device 102 may call the contact center to receive customer service, access information, purchase a product or a service, etc. Caller device 102 may include plain old telephone system (POTS) calls, Session Initiation Protocol (SIP) calls, H.323 calls, etc. These calls may provide for different types of communications, such as videoconference calls, videophone calls, text messaging sessions, Voice-over-Internet Protocol (VoIP) calls, POTS calls, etc.

Network 104 may include one or more public switched telephone networks (PSTNs) or another type of switched network (e.g., IP network). Network 104 may include a number of transmission towers for receiving wireless signals and forwarding the signals toward the intended destination. Network 104 may further include one or more packet switched networks, such as a local area network (LAN), a wide area network (WAN), a personal area network (PAN), an intranet, the Internet, or another type of network (e.g., a satellite-based network) that is capable of exchanging information. Network 106 may include similar components as network 104 and may operate similarly.

Customer network 108 may include one or more telephone networks and/or IP networks. As further shown in FIG. 1, customer network 108 may include one or more of contact center 111. Contact center 111 may include an automatic call distributor (ACD)/IP Private Branch Exchange (PBX) 112, one or more agent phones 114, and one or more agent workstations 116. Although a typical contact center 111 includes many more agent phones and/or agent workstations, for simplicity, they are not illustrated in FIG. 1.

ACD/IP PBX 112 may switch an incoming call to one of agent phones 114. In addition, ACD/IP PBX 112 may communicate with a device(s) (e.g., status server 132) in provider network 110, to inform the device about call events (e.g., failed call), agent events (e.g., a change in the number of agents), and/or transaction data. In some implementations, ACD/IP PBX 112 may modify its call distribution decisions based on input from provider network 110.

Agent phone 114 may include a POTS type telephone or an IP phone (e.g., a soft phone). An agent in contact center 111 may assist a caller via agent phone 114.

Agent workstation 116 may include a personal computer, workstation, laptop, or another type of network device. Agent workstation 116 may receive instructions and/or data, from provider network 110, and display the information to the agent. In some instances, the information may pertain to the caller and/or a transaction (e.g., a problem record, a problem ticket number, how many times the caller has called previously, etc.). In other instances, the information may pertain to the status of the agent (e.g., agent-not-ready status, to indicate that calls are no longer forwarded to the agent).

Provider network 110 may interact with incoming calls, park incoming calls, and/or route incoming calls toward agents in contact center 111 in customer network 108. In handling incoming calls, provider network 110 may avert a breakdown in contact-center wide call routing when telephony/VoIP delivery (e.g., extension) failures prevent call completions. As further shown, provider network 110 may include call router 122, gateway 124, telephony server 126, route server 128, failed route avoidance system (FRAS) 130, status server 132, configuration database 134, application server 136, and server 138.

Call router 122 may interact with incoming calls, park incoming calls, and/or route incoming calls toward agents in contact center 111. In routing calls, call router 122 may communicate with and receive call handling instructions/information from other devices via gateway 124. In addition, call router 122 may notify application server 136 of failed calls.

Gateway 124 may translate and relay communications between call router 122 and telephony server 126, to allow call router 122 and telephony server 126 to comprehend one another.

Telephony server 126 may receive requests, from call router 122 via gateway 124, for instructions on handling incoming calls. Telephony server 126 may forward the requests to route server 128. Upon receipt of a reply (i.e., routing instructions), telephony server 126 may forward to reply to call router 122 via gateway 124.

Route server 128 may receive requests for routing instructions from telephony server 126 and provide the routing instructions based on different criteria and input. For example, route server 128 may provide skills-based routing (e.g., routing based on caller's problem and agent skills best suited to solve the problem), last-agent and relationship based routing (e.g., route based on the caller's prior interaction with an agent), service level routing (e.g., provide routing based on service for which the caller subscribed), cost-based routing (e.g., routing designed to minimize or lower the cost of system resource utilization), business priority routing, etc. In determining routing instructions, route server 128 may consult failed-route avoidance system 130, which may indicate which routes are to be avoided.

Failed route avoidance system 130 may receive a request, from route server 128, to identify failed calls and/or agents to avoid, and return identities of failed calls/agents to route server 128. In determining the agents to avoid, failed route avoidance system may consult configuration database 134. Failed route avoidance system 130 may also identify alternate routes.

When failed route avoidance system 130 obtains new information or updates configuration database 134, failed route avoidance system 130 may send status server 132 the new information/update and/or any status changes related to agents at contact center 111. In some implementations, failed route avoidance system 130 may receive information about contact center 111 from ACD/IP PBX 112 or agent workstation 116, via status server 132. In these implementations, failed route avoidance system 130 may use such information to further update configuration database 134 and in determining call routes to be avoided for incoming calls at call router 122.

Status server 132 may communicate with ACD/IP PBX 112 agent and/or workstation 116. Status server 132 may receive information about call status and/or call/contact agent events from ACD/IP PBX 112, and provide the information to failed route avoidance system 130. In some implementations, status server 132 may provide instructions related to call distribution decisions and agent status to ACD/IP PBX 112 and agent workstation 116, respectively, based on data/information from failed route avoidance system 130.

Configuration database 134 may include: a list of failed calls (herein referred to as "failed call list") and a list of agents to whom calls are not to be routed (herein referred to as "failed route avoidance list"). The failed call list in configuration database 134 may be updated via application server 136 and server 138. The failed route avoidance list may be updated by failed route avoidance system 130.

Application server 136 may receive notification about failed calls from call router 122. Furthermore, application server 136 may proxy the notification to server 138. Server 138 may connect to configuration database 134 and update the failed call list on configuration database 134.

The number of devices and networks and the configuration in network 100 are exemplary and provided for simplicity. In practice, according to other embodiments, network 100 may include additional devices, fewer devices, different devices, and/or differently arranged devices than those illustrated in FIG. 1. Additionally, according to another embodiment, network 100 may include additional networks, fewer networks, and/or differently arranged networks than those illustrated in FIG. 1. For example, depending on the implementation, failed route avoidance system 130 (and/or other devices in network 100) may include failover devices and provide redundancy.

Also, according to another embodiment, one or more functions and/or processes described as being performed by a particular device may be performed by a different device or a combination of devices. For example, according to an embodiment, a function or a process described as being performed by two or more devices may be performed by a single device. Conversely, according to another embodiment, a function or a process described as being performed by a single device may be performed by two or more devices or by a different device. For example, one or more functions and/or processes described as being performed by failed route avoidance system 130 may be performed by status server 132 or vice versa. Also, failed route avoidance system 130 may be combined with status server 132.

Figure 2:
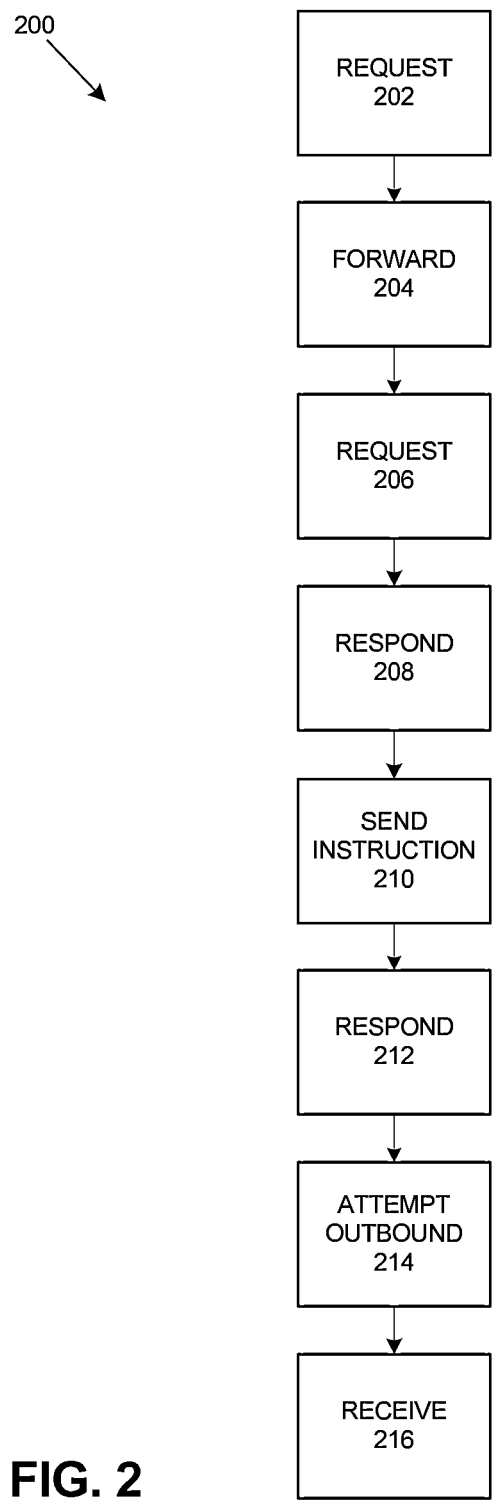
FIG. 2 is a flow diagram of an exemplary process that is associated with routing/extending an incoming call.
Figure 3:
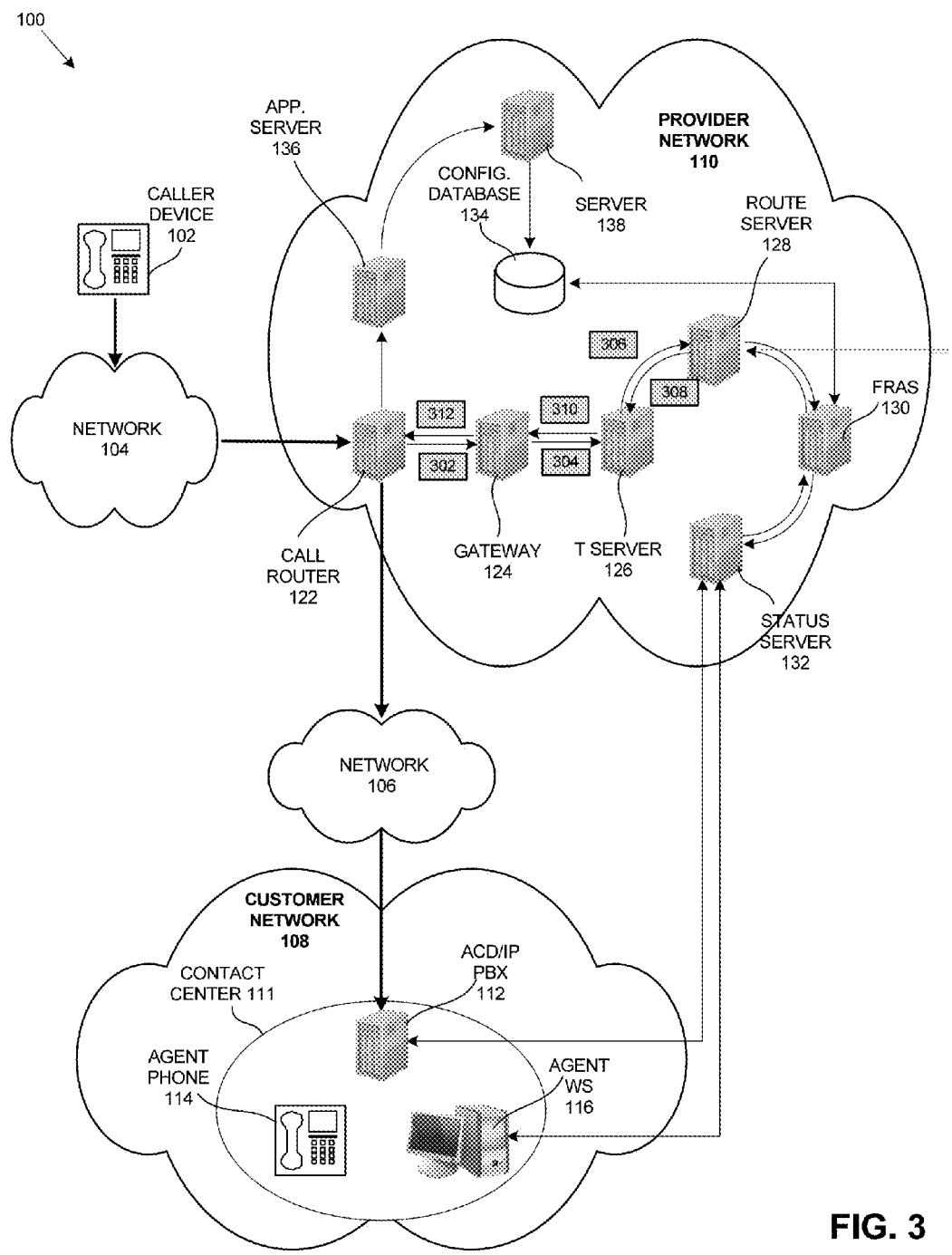
FIG. 3 illustrates an exemplary flow of messages, in the network of FIG. 1, that are associated with the process of FIG. 2.

FIG. 2 is a flow diagram 200 of an exemplary process that is associated with routing/extending an incoming call. Flow diagram 200 is described below with reference to FIG. 2 and FIG. 3. FIG. 3 illustrates an exemplary flow of messages, in network 100, that are associated with process 200. Assume that a user calls a contact center 111 from caller device 102. Assume that the call arrives at call router 122 over network 104.

As shown in FIG. 2 and FIG. 3, process 200 may include call router 122 sending a request 302 for routing instructions toward telephony server 126 via gateway 124 (block 202). When gateway 124 receives request 302, gateway 124 translates request 302 into request 304 and forwards request 304 to telephony server 126 (block 204).

Upon receipt of request 304, telephony server 126 may request route server 128 for routing instructions (block 206). As shown in FIG. 3, telephony server 126 may send message/request 306 to route server 128. In response, route server 128 may determine routing (or call handling) instructions (block 208) and provide the instructions 308 to telephony server 126 (block 210). Instructions 308 may include a destination label (DL), identifying a call agent to which the call may be forwarded.

Telephony server 126 may receive instructions 308 and provide a response 310 to gateway 124 (block 212). In turn, gateway 124 may generate response 312 (e.g., as a result of translating response 310) and send response 312 to call router 122.

When call router 122 receives response 312, which identifies the destination label, call router 122 may attempt to establish an outbound leg of the call (e.g., extend the received call to the identified agent) in contact center 111 (block 214). Call router 122 may receive a response from contact center 111, indicating whether the attempted establishment of the outbound leg of the call is successful (block 216).

Figure 4:
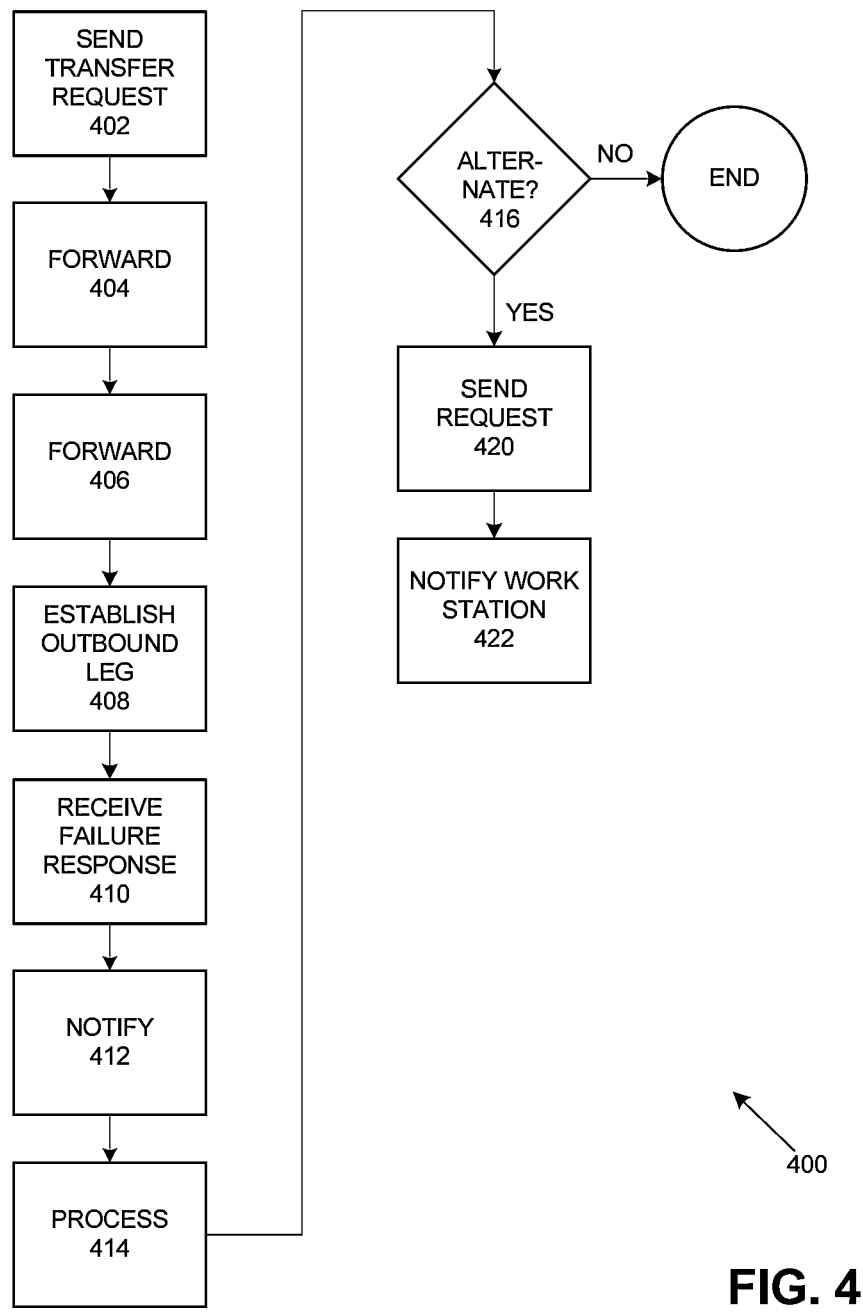
FIG. 4 is a flow diagram of an exemplary process associated with handling a call that fails to be routed to a call agent.
Figure 5:
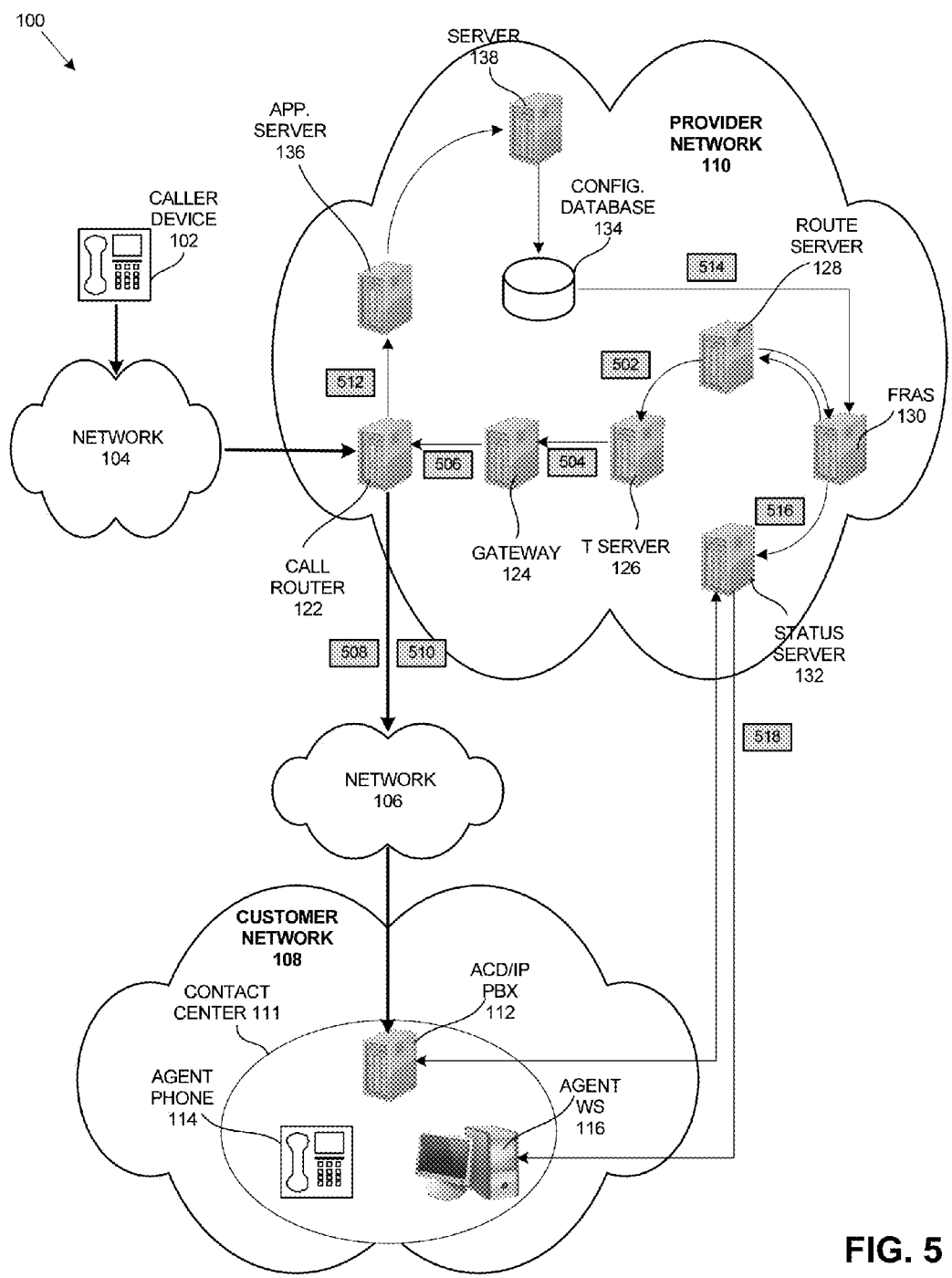
FIG. 5 illustrates an exemplary flow of messages, in the network of FIG. 1, that are associated with the process of FIG. 4.

FIG. 4 is a flow diagram of an exemplary process 400 that is associated with handling a call that cannot be routed to a call/contact agent. FIG. 5 illustrates an exemplary flow of messages, in network 100, that are associated with process 400. Assume that call router 122 received a call from caller device 102 via network 104. In addition, assume that call router 122 requested routing instructions from telephony server 126, which, in turn, requested route server 128 to provide the routing instructions.

As shown in FIG. 4 and FIG. 5, route server 128 may send routing instructions, or a transfer request 502, to telephony server 126. Telephony server 126, in turn, may forward request 502 (as request 504) to gateway 124 (block 404). Gateway 124 may translate request 504 into message 506 and forward message 506 to call router 122 (block 406).

Call router 122 may attempt to establish an outbound leg 508 for the call received from caller device 102 to the selected agent (block 408), in accordance with an identified destination label included in message 506. However, the attempt to extend the call fails (as this process depicts a failure scenario), and customer network 108 returns a failure response 510 to call router 122 (block 410).

Upon receipt of failure response 510, call router sends a notification 512 to application server 136 of the failure to extend the call (block 412). Application server 136 proxies the notification to server 138, which then updates configuration database 134. For example, server 138 may record the failed call in the failed call list in configuration database 134.

When configuration database 134 is updated, failed route avoidance system 130 receives a notification event 514 from configuration database 134 or a device associated with configuration database 134. Failed route avoidance system 130 may process event 514 (block 414) to store call failure information and/or route avoidance information, and may determine whether an alternate routing is to be performed (block 416).

If no alternate routing is to be performed (block 416: no), process 400 may terminate. Otherwise (block 416: yes), failure routing avoidance system 130 may send a request 516 to status server 132, to change the status of the agent to which the attempt to extend the call failed (block 420). In response, status server 132 may send a notification 518 to agent workstation 116 of the agent to which the attempt to extend the call failed (block 422).

Figure 6:
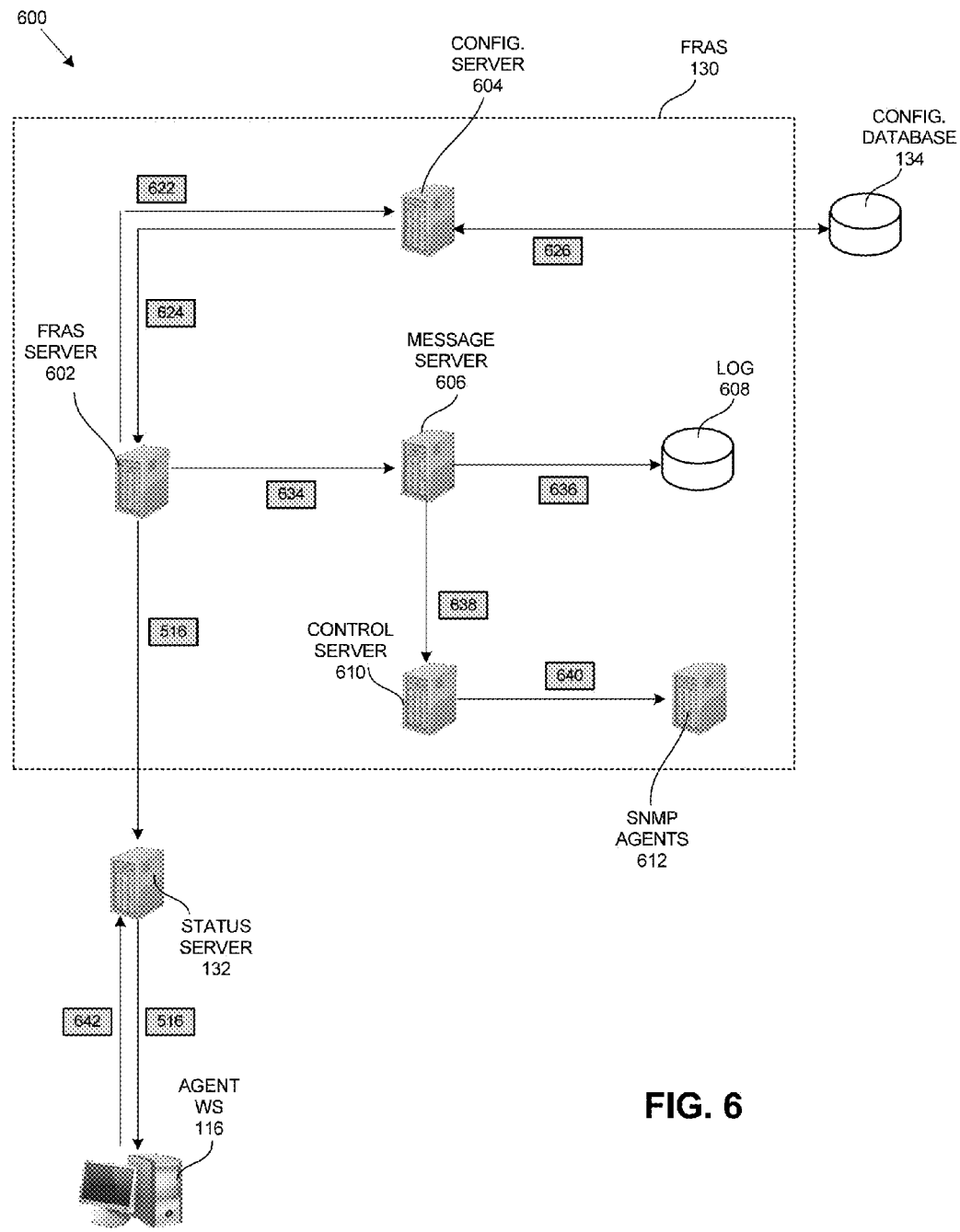
FIG. 6 is a diagram illustrating exemplary components of the failed route avoidance system of FIG. 1.

FIG. 6 is a diagram illustrating exemplary components of failed route avoidance system 130 and a portion of network 100. As shown, failed route avoidance system 130 may include FRAS server 602, a configuration server 604, a message server 606, a log 608, a control server 610, and one or more simple network management protocol (SNMP) agents 612. The functionalities of these devices are described below with reference to messages that are exchanged among the devices/components of failed route avoidance system 130 when call router 122 fails to extend an incoming call, as illustrated in FIGS. 4 and 5.

FRAS server 602 may host a program/code for failure avoidance. In one implementation, the program/code sends a registration message 622 to configuration server 604, to be notified of call events. Accordingly, when call router 122 adds an element (e.g., data pertaining to a failed call) to configuration database 134, configuration server 604 sends an event 624 to FRAS server 602, notifying FRAS server 602 of the failed call. FRAS server 602 then processes the event/data pertaining to the failed call.

When configuration server 604 notifies FRAS server 602, configuration server 604 also sends an update request 626, to configuration database 134, to update the failed route avoidance list and/or the failed call list in configuration database 134. In response, configuration database 134 may update the failed route avoidance list (e.g., insert data on agent/route to be avoided) and/or the failed call list (e.g., delete information pertaining to the failed call).

When FRAS server 602 processes the event/data related to the failed call, FRAS server 602 sends a log request/message 634 to message server 606. Message server 606 is transactional, and accordingly, provides for transactional integrity with regard to the logging of message 634, as log data 636, at log 608.

When message server 606 sends log data 636 to log 608, message server 606 also sends a message 638 to control server 610, indicating that the information about the failed call and its processing is logged at log 608. Control server 610 sends messages 640 to SNMP agents 612, by initiating a SNMP script for alarm conditions. SNMP agents 612 may trap alarm conditions, and notify other devices in network 100.

When FRAS server 602 processes the event/data related to the failed call, FRAS server 602 also sends instructions/request 516 (see also FIG. 5) to status server 132, to change the status of the agent to which the attempt to extend the call failed. As described above, status server 132 may send notification 516 to agent workstation 116. Message 516 may request, for example, agent workstation 116 to set the status of the agent as "agent not ready." In some implementations, agent workstation 116 may send an authentication request 642 to status server 132, before changing the status of the agent.

Depending on the implementation, failed route avoidance system 130 may include additional, fewer, different, or differently arranged devices than those illustrated in FIG. 6. For example, failed route avoidance system 130 may include additional SNMP agents.

Figure 7A:
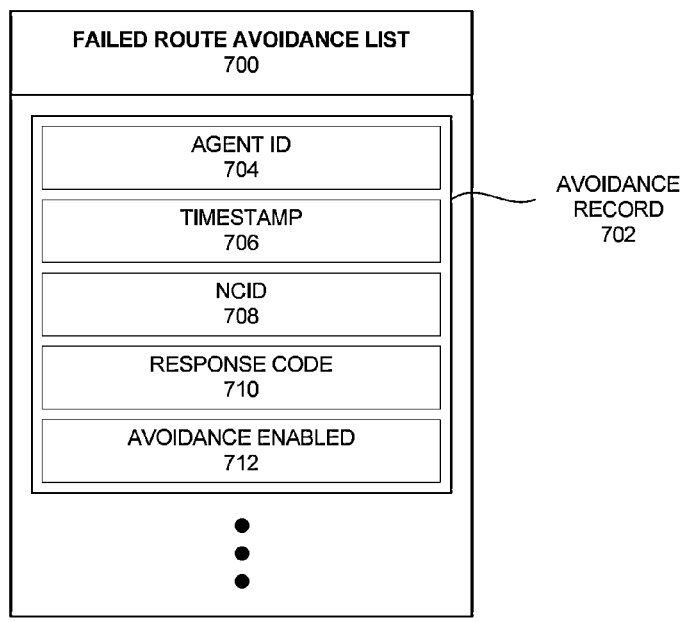
FIG. 7A is a diagram illustrating an exemplary failed route avoidance list stored in the configuration database of FIG. 1.

In FIGS. 4-6, failed route avoidance system 130 updates and/or modifies the failed route avoidance list in configuration database 134. FIG. 7A is a diagram illustrating an exemplary failed route avoidance list 700. According to one implementation, failed route avoidance list 700 may be a transactional list (e.g., a table/list guaranteed to have transactional properties (e.g., atomicity, consistency, isolation, durability, and concurrency)).

As shown, failed route avoidance list 700 may include one or more avoidance records 702. As further shown, each avoidance record 702 may include an agent identifier (ID) field 704, a timestamp field 706, a network based caller id (NCID) field 708, a response code field 710, and an avoidance enabled field 712. Depending on the implementation, avoidance record 702 may include additional, fewer, different, or a different arrangement of fields than those illustrated in FIG. 7A.

Agent ID field 704 may include an identifier for an agent that is in an avoidance state—the state in which call router 122 does not extend an incoming call to the agent. Timestamp field 706 may include the time at which the agent was placed in the avoidance state. NCID field 708 may include a network based caller ID of the call that triggered the avoidance.

Response code field 710 may include a response code, from customer network 108, that triggered the agent avoidance. Avoidance enabled flag field 712 may include a flag to indicate whether the agent is currently in the avoidance state (e.g., "1" or "true" to indicate that the agent is in the avoidance state). In some implementations, an operator in provider network 110 may view what actions failed route avoidance system 130 would take if the avoidance flag were enabled. Accordingly, the operator may modify the value in avoidance enabled flag field 712 if the operator determines that modifying the value is beneficial for callers/customer network 108.

Figure 7B:
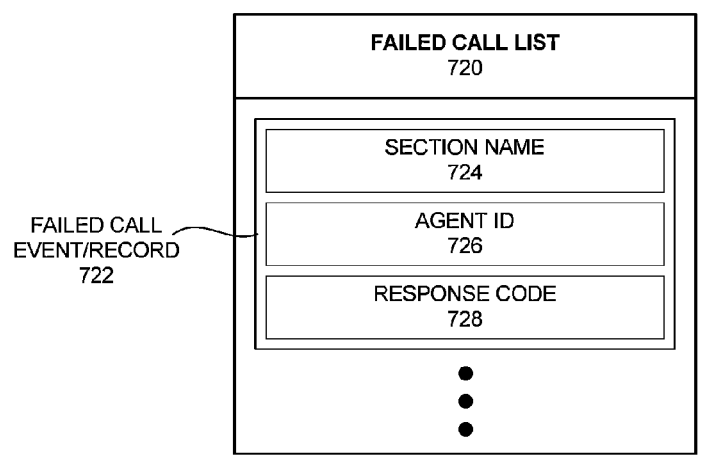
FIG. 7B is a diagram illustrating an exemplary failed call list in the configuration database of FIG. 1.

In addition to maintaining the failed route avoidance list, failed route avoidance system 130 may maintain a failed call list in configuration database 134. FIG. 7B is a diagram illustrating an exemplary failed call list 720. According to one implementation, failed call list 720 may be a transactional list. As shown, failed call list 720 may include one or more of failed call event/record 722. As further shown, each failed call event/record 722 may include a section name field 724, an agent ID field 726, and a response code field 728.

Section name field 724 may include, for a failed call, a section name, which is formed by concatenating an NCID of the caller and a timestamp associated with the call. Each section name is guaranteed to be unique in configuration database 134.

Agent ID field 726 may include an identifier for an agent to which the call failed to be extended by call router 122. Response code field 728 may include a response code from network 108 or network 106 (e.g., a network element between call router 122 and agent phone 114) when network 108/106 does not allow the call to be extended to a contact agent in contact center 111.

During both a startup and a failover of failed route avoidance system 130, failed route avoidance system 130 may examine both failed route avoidance list 700 and failed call list 720, to determine which avoidance records 702 and failed call event/records 722 are stale. Failed route avoidance system 130 may remove the stale records, respectively, from failed route avoidance list 700 and failed call list 720. In removing an avoidance record 702 from failed route avoidance list 700, failed route avoidance system 130 performs all actions that are consistent with a removal of an avoidance record 702 during its normal operation, such as sending a message to status server 132, to notify a corresponding agent workstations 116.

Figure 8:
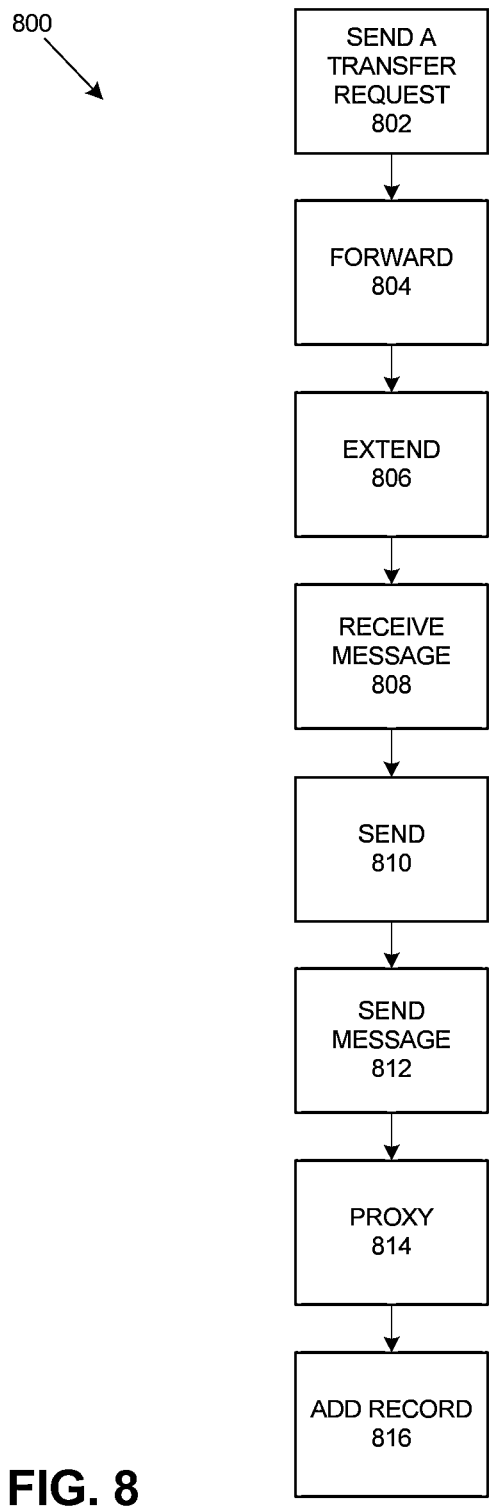
FIG. 8 is a flow diagram of an exemplary process that is associated with updating the failed call list of FIG. 7B.
Figure 9:
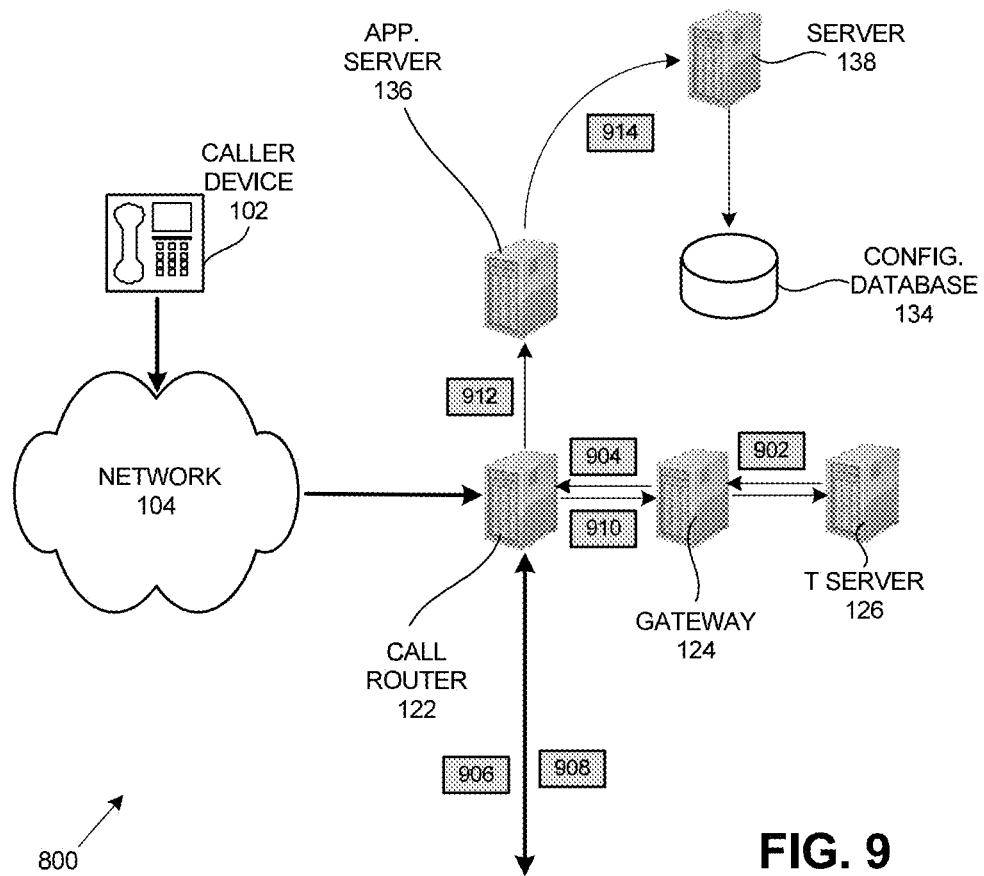
FIG. 9 illustrates an exemplary flow of messages in the network of FIG. 1, that are associated with the process of FIG. 8.

FIG. 8 is a flow diagram of an exemplary process 800 that is associated with updating failed call list 720 of FIG. 7B. FIG. 9 illustrates an exemplary flow of messages, in network 100, that are associated with process 800 of FIG. 8. Assume that call router 122 received an incoming call. Furthermore, assume that call router 122 requested telephony server 126 for routing/call handling instructions and that telephony server 126 consulted route server 128 for the routing/call handling instructions.

As shown in FIG. 8 and FIG. 9, telephony server 126 may send a transfer request/instruction 902 to gateway 124 (block 802). Gateway 124 may forward the request 902 as request 904 to call router 122 (block 804). Upon receipt of request 904, call router 122 may attempt to extend the incoming call as call 906 (block 806).

When the attempt to extend the call fails, customer network 108 may send a message 908 that includes a response code (e.g., a code that indicates a reason for the failure to extend the call) to call router 122. When call router 122 receives message 908 (block 808), call router sends a response 910 to gateway 124 (block 810).

In addition, call router 122 sends a message 912 (e.g., https message) to application server 136 (block 812). Message 912 may include, for example, an agent ID, NCID of the failed call, a response code (e.g., included in message 908), a timestamp associated with the call, configuration server 604's IP addresses, configuration server 604's port number, etc.

When application server 136 receives message 912, application server 136 may proxy message 912, as message 914, to server 138 (block 814). Server 138 may then connect to configuration server 604 that, in turn, adds a record to failed call list 720 in configuration database 134. If server 138 is already connected to configuration server 604, server 138 may use the existing connection. If there is no pre-existing connection, server 138 may establish a new connection. If server 138 is unable to establish a connection with configuration server 604, failed route avoidance system 130 may generate alarm(s) and log the failure.

Process 800 is associated with failed route avoidance system 130 updating failed call list 720. Depending on situations, failed route avoidance system 130 may be unable to update failed call list 720. For example, FRAS server 602 may be unable to connect to configuration server 604. Consequently, failed route avoidance system 130 may be unable to add/remove either an avoidance record 702 to/from failed route avoidance list 700 or a failed call/event record 722 to/from failed call list 720.

Failed route avoidance system 130 may operate in different configurations. FIG. 10 shows exemplary configurable parameters for failed route avoidance system 130 according to one embodiment. As shown in FIG. 10, configurable parameters 1000 may include an alarming threshold enabled 1002, route avoidance enabled 1004, failed route count threshold 1006, failed route time enabled 1008, failure response codes 1010, avoidance sensitivity 1012, SNMP destination 1014, log location 1016, tracking failure reaction 1018, and avoidance time 1020. Depending on the implementation, failed route avoidance system 130 may include additional, fewer, or different configurable parameters than those illustrated in FIG. 10.

Alarming threshold enabled 1002 can be set to either "true" or "false." The "true"/"false" may indicate that failed route avoidance system 130 will/will not generate SNMP traps when one or more different thresholds are exceeded (e.g., a number of failed routes exceeds a threshold, an amount of time for which a route remains in an avoidance state exceeds a threshold, etc.). Route avoidance enabled 1004 may indicate whether failed route avoidance system 130 will engage in avoidance when one or more thresholds are exceeded.

Failed route count threshold 1006 indicates the number of call extension failures that need to have occurred for a specific destination prior to initiating a route avoidance and/or alarming. Failed route time threshold 1008 indicates the length of time, between failed calls, that must elapse before initiating a route avoidance and/or alarming. For example, if the time between the oldest and newest failed calls for a destination is less than or equal to the value of failed route count threshold 1006, failed route avoidance system 130 may initiate a route avoidance for the destination.

Failure response codes 1010 may include a list of codes. If network 106, contact center 111, customer network 108, or a device between call router 122 and agent phone 114 returns any of these codes in response to call router 122's attempt to extend a call to an agent in contact center 111, failed route avoidance system 130 may deem the attempt to extend the call or the call itself as a failure. Avoidance sensitivity 1012 may indicate how often failed route avoidance system 130 determines whether agents currently being avoided by failed route avoidance system 130 are no longer to be avoided by call router 122.

SNMP destination 1014 provides a destination IP address and a port number for SNMP traps that are generated by failed route avoidance system 130. Log location 116 may specify a path to a mount point/directory at which failed route avoidance system 130 stores its log.

Tracking failure reaction 1018 may indicate whether failed route avoidance system 130 may continue to its operation when failed route avoidance system 130 fails to add a failed call to failed call list 720 in configuration database 134.

When call router 122 attempts to extend a call, call router 122 may receive a response code from network 106/contact center 111/customer network 108. Furthermore, call router 122 may pass the response code to failed route avoidance system 130. Each of the response codes may be a signaling system number 7 (SS7) code or session initiation protocol (SIP) code. In some implementations, the response code may be from another type of telephony delivery system (e.g., H.323, Megaco/H.248, Media Gateway Control Protocol (MGCP), etc.)

Each response code may indicate a status of the call being extended or the cause or the reason for failure to extend the call. A response code may indicate that a call failed to extend because, for example: an extension number is unallocated/unassigned number; no route to the destination exists; the extension/call is rejected; no circuit is available; there is a temporary failure in the network; a network is out of order; the call is accepted; an extension request is a bad request; an extension request is unauthorized; an extension request is not acceptable; etc. As described above, some of these response codes may be listed as failure response codes 1010.

Figure 11:
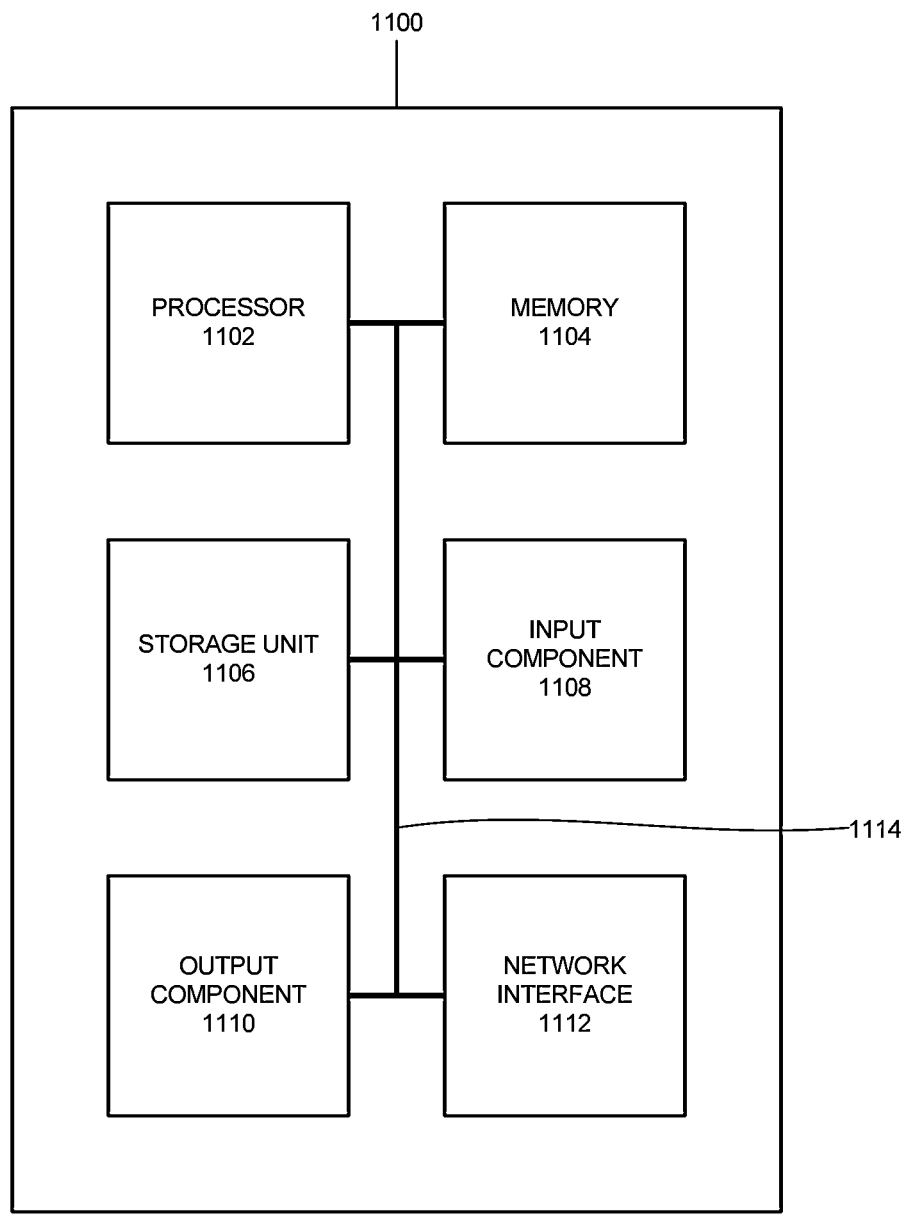
FIG. 11 is a block diagram of exemplary components of a network device.

FIG. 11 is a block diagram of an exemplary network device 1100, which may correspond to one or more of devices in FIGS. 1, 3, 5, 6, and 9 (e.g., devices 102-138 and 602-612). As shown, device 1100 may include a processor 1102, memory 1104, storage unit 1106, input component 1108, output component 1110, network interface 1112, and communication path 1114. In different implementations, device 1100 may include additional, fewer, different, or different arrangement of components than the ones illustrated in FIG. 11. For example, device 1100 may include line cards for connecting to external buses.

Processor 1102 may include a processor, a microprocessor, an Application Specific Integrated Circuit (ASIC), a Field Programmable Gate Array (FPGA), and/or other processing logic (e.g., embedded devices) capable of controlling device 1100. Memory 1104 may include static memory, such as read only memory (ROM), and/or dynamic memory, such as random access memory (RAM), or onboard cache, for storing data and machine-readable instructions (e.g., programs, scripts, etc.). Storage unit 1106 may include a floppy disk, CD ROM, CD read/write (R/W) disc, and/or flash memory, as well as other types of storage devices (e.g., hard disk drive) for storing data and/or machine-readable instructions (e.g., a program, script, etc.).

Input component 1108 and output component 1110 may provide input and output from/to a user to/from device 1100. Input/output components 1108 and 1110 may include a display screen, a keyboard, a mouse, a speaker, a microphone, a camera, a DVD reader, Universal Serial Bus (USB) lines, and/or other types of components for converting physical events or phenomena to and/or from signals that pertain to device 1100.

Network interface 1112 may include a transceiver (e.g., a transmitter and a receiver) for device 1100 to communicate with other devices and/or systems. For example, via network interface 1112, device 1100 may communicate over a network, such as the Internet, an intranet, a terrestrial wireless network (e.g., a WLAN, WiFi, WiMax, etc.), a satellite-based network, optical network, etc. Network interface 1112 may include a modem, an Ethernet interface to a LAN, and/or an interface/connection for connecting device 1100 to other devices (e.g., a Bluetooth interface).

Communication path 1114 may provide an interface through which components of device 1100 can communicate with one another.

As described below, failed route avoidance system 130 may include devices and components for averting contact center-wide call routing breakdown when telephony/Voice-over-Internet protocol (VoIP) delivery (e.g., extension) failures thwart call completions. Failed route avoidance system 130 may avert the breakdown by avoiding extending/routing calls to contact center agents to whom calls could not be completed. Without avoiding extending/routing the calls, such failures can lead to a wider contact center outage. Although failed route avoidance system 130 may not be able to pinpoint the reasons for the individual failures to extending incoming calls to contact center agents, failed route avoidance system 130 may still prevent the compromised calls from causing undue harm to the overall contact center call routing.

The foregoing description of implementations provides illustration, but is not intended to be exhaustive or to limit the implementations to the precise form disclosed. Modifications and variations are possible in light of the above teachings or may be acquired from practice of the teachings.

For example, while series of blocks have been described with regard to an exemplary process illustrated in FIGS. 2, 4, and 8, the order of the blocks may be modified in other implementations. In addition, non-dependent blocks may represent acts that can be performed in parallel to other blocks. Furthermore, one or more of the blocks may be omitted in other implementations.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

No element, act, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
receiving, at a device in a provider network, a request to insert a record, of a call that failed to be extended to a contact agent in a customer network, into a failed call list;
inserting, by the device, the record into the failed call list in response to receiving the request;
identifying a response code that was returned from a network element located between a call router that failed to extend the call and a second device of the contact agent to which the call was to be extended;
receiving, at the device, an avoidance record corresponding to the record of the call that failed to be extended when the response code indicates that the avoidance record should be inserted into an avoidance list;

inserting, by the device, the avoidance record, corresponding to the record of the call that failed to be extended, into the avoidance list;

removing, by the device, the record of the call from the failed call list; and routing, by the device, the call based on the avoidance list.

2. The method of claim 1, further comprising:

removing the avoidance record from the avoidance list when a predetermined length of time elapses after the avoidance record is inserted into the avoidance list to allow an agent associated with the avoidance record to receive calls.

3. The method of claim 1, further comprising:

logging the insertion of the avoidance record into the avoidance list.

4. The method of claim 1, further comprising:

sending a message toward a workstation of the contact agent, the message indicating that incoming calls will no longer be extended to the contact agent.

5. The method of claim 1, wherein the record of the failed call includes at least one of:

a network-based caller identifier (ID);

the response code from the network element between a call router that failed to extend the call and the second device, of the contact agent, to which the call was to be extended; or a timestamp indicating a time of receipt of the call at the provider network.

6. The method of claim 1, further comprising:

receiving the call at a call router device; and attempting to extend the call, at the call router device, to the contact agent in the customer network.

7. The method of claim 6, further comprising:

when a network element sends the response code indicating that the attempt to extend the call failed, sending the request from the call router device to the device.

8. The method of claim 1, wherein the failed call list includes a transactional list.

9. The method of claim 1, further comprising:

removing a stale record from the failed call list during a failover of the failed call list; and removing a stale record from the avoidance list during a startup of a database in which the avoidance list is stored.

10. A system comprising:

a failed route avoidance device to:

receive a notification that a record, of a call that failed to be extended to a contact agent in a customer network, is inserted into a failed call list, wherein the record includes information about the call;

determine whether an identifier for the contact agent associated with the call is to be placed in an avoidance list based on a response code that a network element sends, to a call router that received the call, when a connection from the call at the call router to the contact agent fails to be established;

generate an avoidance record when the failed route avoidance device determines that the identifier for the contact agent is to be placed in the avoidance list, wherein the avoidance record includes the identifier for the contact agent; and send the avoidance record to a configuration device that inserts the avoidance record into the avoidance list.

11. The system of claim 10, wherein the failed route avoidance device is further configured to:

send a message to an agent workstation of the contact agent, to indicate that incoming calls received at the call router will not be extended to the contact agent.

12. The system of claim 10, wherein the call router device is configured to:

receive the call from a user device;

attempt to extend the call in accordance with routing information; and send the call toward the configuration device when the attempt to extend the call fails.

13. The system of claim 12, further comprising:

an application server device to proxy the call from the call router to another device.

14. The system of claim 12, further comprising:

a route device to provide the routing information to the call router.

15. The system of claim 10, wherein the avoidance record includes:

a unique identifier comprising a timestamp and a network-based caller identifier (NCID); and the identifier for the contact agent.

16. The system of claim 10, wherein the configuration device is configured to:

remove the avoidance record from the avoidance list when a predetermined length of time elapses after the configuration device inserts the avoidance record into the avoidance list.

17. The system of claim 10, wherein the configuration device is configured to:

send an event, to the failed route avoidance device, that indicates the record, of the call that failed to be extended, is inserted into the failed call list; and receive the avoidance record from the failed route avoidance device.

18. The system of claim 17, further comprising:

a message server device to:

log a record of activities of the failed route avoidance device; and notify simple network management protocol (SNMP) agents of at least some of the record of activities.

19. A non-transitory computer-readable medium comprising computer executable instructions, when executed by one or more processors, cause the one or more processors to:

receive a notification that a record, of a call that failed to be extended to a contact agent in a customer network, is inserted into a failed call list, wherein the record includes information about the call;

determine whether an identifier for the contact agent associated with the call is to be placed in an avoidance list based on a response code that a network element sends, to a call router that received the call, when a connection from the call at the call router to the contact agent fails to be established;

generate an avoidance record when the one or more processors determine that the identifier for the contact agent is to be placed in the avoidance list, wherein the avoidance record includes the identifier for the contact agent; and send the avoidance record to a configuration device that inserts the avoidance record into the avoidance list.

20. The non-transitory computer-readable medium of claim 19, wherein the avoidance record further includes:

a unique identifier comprising a timestamp and a network-based caller identifier (NCID).

* * * * *